United States Patent
Short et al.

(10) Patent No.: US 9,601,102 B2
(45) Date of Patent: *Mar. 21, 2017

(54) AMBIENT NOISE CANCELLATION FOR VOICE COMMUNICATION DEVICE

(71) Applicant: AT&T INTELLECTUAL PROPERTY I, LP, Atlanta, GA (US)

(72) Inventors: Shannon M. Short, Atlanta, GA (US); William A. Hartselle, Norcross, GA (US); Vernon Meadows, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,962

(22) Filed: Apr. 19, 2016

(65) Prior Publication Data

US 2016/0232888 A1 Aug. 11, 2016

Related U.S. Application Data

(63) Continuation of application No. 13/924,733, filed on Jun. 24, 2013, now Pat. No. 9,369,799, which is a
(Continued)

(51) Int. Cl.
*H04B 15/00* (2006.01)
*G10K 11/178* (2006.01)
(Continued)

(52) U.S. Cl.
CPC ...... *G10K 11/1784* (2013.01); *H04M 1/6008* (2013.01); *H04R 3/002* (2013.01);
(Continued)

(58) Field of Classification Search
CPC ...... H04R 3/002; H04R 3/00; H04R 2410/01; H04R 2410/05; H04R 3/005; G10L 21/0208; G10L 2021/02165
(Continued)

(56) References Cited

U.S. PATENT DOCUMENTS 2,574,887 A 11/1951 Pye
3,952,158 A 4/1976 Kyle
(Continued)

OTHER PUBLICATIONS

Active Noise Reduction Headphone Systems, by Chu Moy, 2001 (May be found at http://www.headwize.com/tech/anr_tech.htm).
(Continued)

*Primary Examiner* — Disler Paul
(74) *Attorney, Agent, or Firm* — Hartman & Citrin LLC

(57) ABSTRACT

A system and method for reducing or entirely canceling background or ambient noise from a voice transmission from a communications device. A communications device, such as a mobile telephone, is configured with an ambient noise compensation signal generator that is connected between a first microphone and a mixer. A second microphone is employed to detect ambient noise. An original output of the first microphone and a compensation signal generated by the ambient noise compensation signal generator are mixed together prior to being passed to a transmitter. A buffer is provided between the microphone and the mixer to help synchronize the timing of the signals to be mixed and an output of the mixer is provided to an antenna.

20 Claims, 3 Drawing Sheets

Related U.S. Application Data continuation of application No. 12/246,348, filed on Oct. 6, 2008, now Pat. No. 8,472,641, which is a continuation of application No. 11/250,035, filed on Oct. 13, 2005, now Pat. No. 7,450,691, which is a continuation of application No. 10/101,715, filed on Mar. 21, 2002, now Pat. No. 6,978,010.

(51) Int. Cl.
*H04M 1/60* (2006.01)
*H04R 3/00* (2006.01)

(52) U.S. Cl.
CPC ............... *G10K 2210/1081* (2013.01); *G10K 2210/3036* (2013.01); *G10K 2210/3045* (2013.01); *H04R 3/005* (2013.01)

(58) Field of Classification Search
USPC ............ 381/91–92, 94.1–94.7; 704/226, 233
See application file for complete search history.

(56) References Cited

U.S. PATENT DOCUMENTS

| | | |
|---|---|---|
| 3,970,774 A | 7/1976 | Bazin |
| 4,064,362 A | 12/1977 | Williams |
| 4,239,936 A | 12/1980 | Sakoe |
| 4,455,675 A | 6/1984 | Bose et al. |
| 4,589,133 A | 5/1986 | Swinbanks |
| 4,596,033 A | 6/1986 | Swinbanks |
| 4,625,083 A | 11/1986 | Poikela |
| 4,817,198 A | 3/1989 | Rinderle |
| 5,117,401 A | 5/1992 | Feintuch |
| 5,126,681 A | 6/1992 | Ziegler, Jr. |
| 5,181,252 A | 1/1993 | Sapiejewski |
| 5,412,735 A | 5/1995 | Engebretson et al. |
| 5,425,105 A | 6/1995 | Lo |
| 5,473,684 A | 12/1995 | Bartlett et al. |
| 5,485,515 A | 1/1996 | Allen et al. |
| 5,615,256 A | 3/1997 | Yamashita |
| 5,673,325 A | 9/1997 | Andrea et al. |
| 5,732,143 A | 3/1998 | Andrea et al. |
| 5,740,256 A | 4/1998 | Castello Da Costa et al. |
| 5,754,665 A | 5/1998 | Hosoi |
| 5,757,933 A | 5/1998 | Preves et al. |
| 5,839,101 A | 11/1998 | Vahatalo et al. |
| 5,917,921 A | 6/1999 | Sasaki et al. |
| 5,937,070 A | 8/1999 | Todter et al. |
| 5,966,438 A | 10/1999 | Romesburg |
| 6,001,131 A | 12/1999 | Raman |
| 6,055,318 A | 4/2000 | Whitecar |
| 6,233,462 B1 | 5/2001 | Kanai |
| 6,298,247 B1 | 10/2001 | Alperovich et al. |
| 6,317,501 B1 | 11/2001 | Matsuo |
| 6,363,344 B1 | 3/2002 | Higuchi |
| 6,430,295 B1 | 8/2002 | Handel et al. |
| 6,549,586 B2 | 4/2003 | Gustafsson et al. |
| 6,961,591 B2 | 11/2005 | Osano |
| 6,978,010 B1 | 12/2005 | Short et al. |
| 7,020,288 B1* | 3/2006 | Ohashi ................. G10K 11/178 381/71.4 |
| 7,050,971 B1 | 5/2006 | Kaufholz |
| 7,450,691 B2 | 11/2008 | Short et al. |
| 8,767,969 B1 | 7/2014 | Laroche et al. |
| 2002/0009203 A1 | 1/2002 | Erten |
| 2002/0141598 A1* | 10/2002 | Vayrynen ............ G10L 21/0208 381/71.1 |
| 2002/0141599 A1* | 10/2002 | Trajkovic ........... G10K 11/1788 381/71.6 |
| 2003/0035551 A1* | 2/2003 | Light ...................... A61F 11/14 381/71.6 |
| 2003/0044025 A1 | 3/2003 | Ouyang et al. |
| 2008/0051157 A1 | 2/2008 | Kim |

OTHER PUBLICATIONS

*Duplan Corp.* v. *Deering Milliken, Inc.* 197 USPQ 342 (D.S.C. 1977).
U.S. Office Action dated Jul. 11, 2011 in U.S. Appl. No. 12/246,348.
U.S. Office Action dated Dec. 29, 2011 in U.S. Appl. No. 12/246,348.
U.S. Office Action dated Jun. 7, 2012 in U.S. Appl. No. 12/246,348.
U.S. Notice of Allowance dated Mar. 1, 2013 in U.S. Appl. No. 12/246,348.
U.S. Office Action dated Sep. 19, 2006 in U.S. Appl. No. 11/250,035.
U.S. Office Action dated Mar. 22, 2007 in U.S. Appl. No. 11/250,035.
U.S. Office Action dated Sep. 10, 2007 in U.S. Appl. No. 11/250,035.
U.S. Office Action dated Mar. 6, 2008 in U.S. Appl. No. 11/250,035.
U.S. Notice of Allowance dated Aug. 22, 2008 in U.S. Appl. No. 11/250,035.
U.S. Office Action dated Apr. 22, 2004 in U.S. Appl. No. 10/101,715.
U.S. Office Action dated Dec. 29, 2004 in U.S. Appl. No. 10/101,715.
U.S. Office Action dated Apr. 6, 2005 in U.S. Appl. No. 10/101,715.
U.S. Notice of Allowance dated Aug. 19, 2005 in U.S. Appl. No. 10/101,715.
U.S. Office Action dated May 18, 2015 in U.S. Appl. No. 13/924,733.
U.S. Notice of Allowance dated Oct. 15, 2015 in U.S. Appl. No. 13/924,733.
U.S. Notice of Allowance dated Feb. 3, 2016 in U.S. Appl. No. 13/924,733.

* cited by examiner

AMBIENT NOISE CANCELLATION FOR VOICE COMMUNICATION DEVICE

CROSS-REFERENCE TO RELATED APPLICATIONS

This application is a continuation of and claims priority to U.S. patent application Ser. No. 13/924,733 filed Jun. 24, 2013, now U.S. Pat. No. 9,369,799, which is a continuation of and claims priority to U.S. patent application Ser. No. 12/246,348 filed Oct. 6, 2008, now U.S. Pat. No. 8,472,641, which is a continuation of and claims priority to U.S. patent application Ser. No. 11/250,035 filed Oct. 13, 2005, now U.S. Pat. No. 7,450,691, which is a continuation of and claims priority to U.S. patent application Ser. No. 10/101,715, filed Mar. 21, 2002, now U.S. Pat. No. 6,978,010. The contents of U.S. patent application Ser. No. 13/924,733 is/are hereby incorporated by reference into this application as if set forth herein in full.

FIELD OF THE DISCLOSURE

The present invention relates generally to voice communication and, more specifically, to automated control to compensate for variable ambient noise levels.

BACKGROUND OF THE DISCLOSURE

Voice communication devices such as mobile telephones have become ubiquitous; they show up in almost every environment. They are used in the home, at the office, in the car, on a train, at the airport, at the beach, at restaurants and bars, on the street, and almost any other imaginable venue. As might be expected, these diverse environments have relatively higher and lower levels of background or ambient noise. For example, there is generally less noise in a quiet home than there is in a crowded bar.

Significantly, in an on-going telephone call from an environment having relatively higher ambient noise, it is sometimes difficult for the party at the other end of the connection to hear what the party in the noisy environment is saying. That is, the ambient noise in the environment often "drowns out" the mobile telephone user's voice, whereby the other party cannot hear what is being said.

SUMMARY OF THE INVENTION

The present invention provides a novel system and method for monitoring the ambient noise in the environment in which a voice communications device or mobile telephone is operating and canceling the ambient noise before the ambient noise is transmitted to the other party so that the party at the other end of the voice communication link can more easily hear what the mobile telephone user is transmitting.

The present invention preferably employs noise cancellation technology that is operable to attenuate or even eliminate pre-selected portions of an audio spectrum. By monitoring the ambient noise in the location in which the mobile telephone is operating and applying noise cancellation protocols at the appropriate time, it is possible to significantly reduce the background noise to which a party to a telephone call might be subjected.

It is therefore an object of the present invention to provide a system and method that enhances the convenience of using a mobile communications device, even in a location having relatively loud ambient noise.

It is also an object of the present invention to provide a system and method for canceling ambient noise before the ambient noise is transmitted to another party.

It is yet another object of the present invention to monitor ambient noise via a second microphone associated with a mobile telephone and thereafter cancel the monitored ambient noise.

It is still another object of the present invention to provide an enable/disable switch on a mobile communications device to enable/disable the noise cancellation features of the invention.

These and other objects of the present invention will become apparent upon reading the following detailed description in conjunction with the associated drawings.

DETAILED DESCRIPTION OF THE DRAWINGS

The present invention provides a unique background noise or ambient noise cancellation feature for a communications device such as a mobile (or cellular) telephone or even a conventional wire line telephone. While the present invention has applicability to at least these types of communications devices, the principles of the present invention are particularly applicable to all types of communications devices. For simplicity, the following description employs the term "mobile telephone" as an umbrella term to describe the embodiments of the present invention, but those skilled in the art will appreciate that the use of such term is not to be considered limiting to the scope of the invention, which is set forth by the claims appearing at the end of this description.

Figure 1:
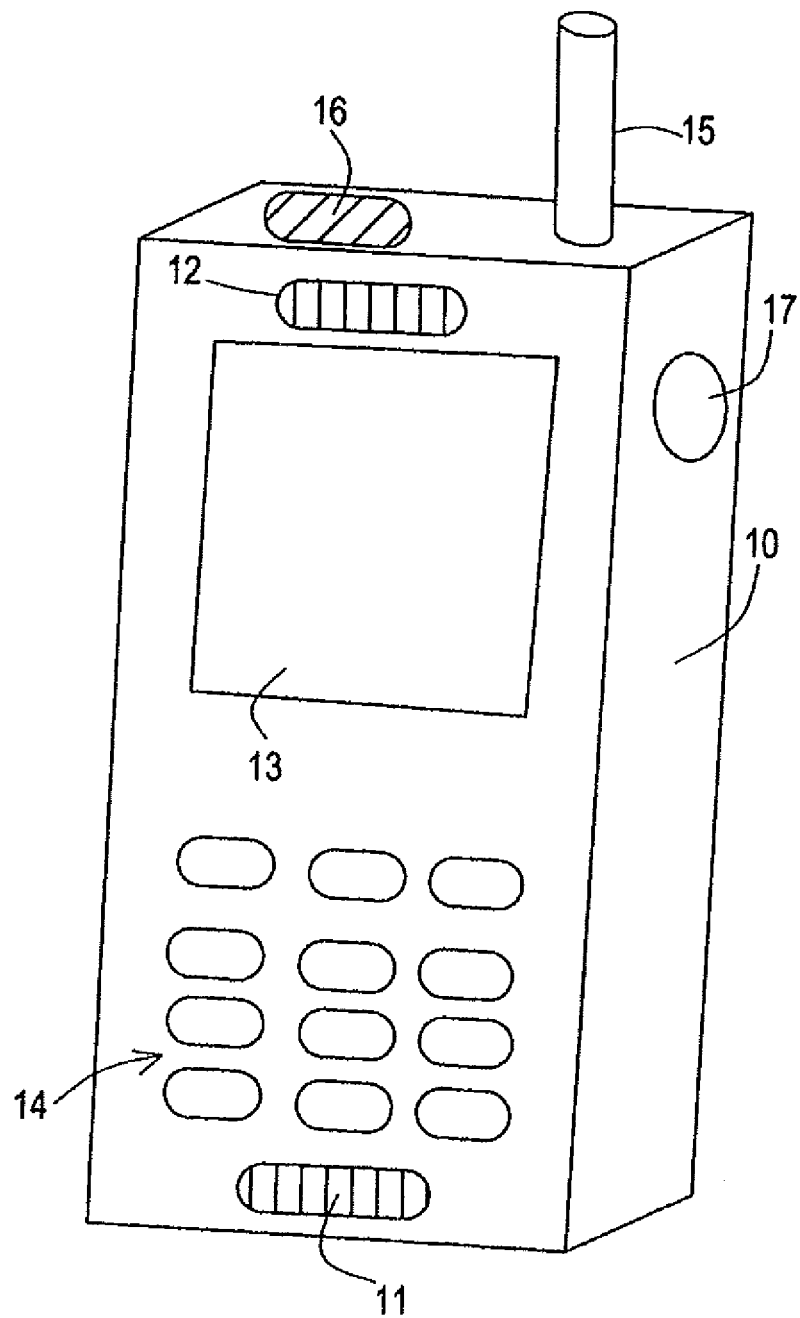
FIG. 1 illustrates an exemplary mobile telephone including an optional second microphone for sampling ambient noise and an enable/disable button in accordance with the present invention.

FIG. 1 illustrates an exemplary mobile telephone 10 that comprises a microphone 11, a speaker 12, a display screen 13, a keypad 14 and an antenna 15. Optionally, a second microphone 16 for sampling ambient noise level and an ambient noise compensation enable/disable button 17 may also be provided. These latter two elements will be described more fully below. Those skilled in the art will appreciate that speaker 12 could be replaced by an ear piece (not shown) that is worn by the mobile telephone user in the conventional manner. Speaker 12 is used herein to mean the device by which sound is transferred from the mobile telephone to the user. Also, display screen 13 could be a touch screen display, which might incorporate keypad 14 as well as enable/disable button 17.

Figure 2:
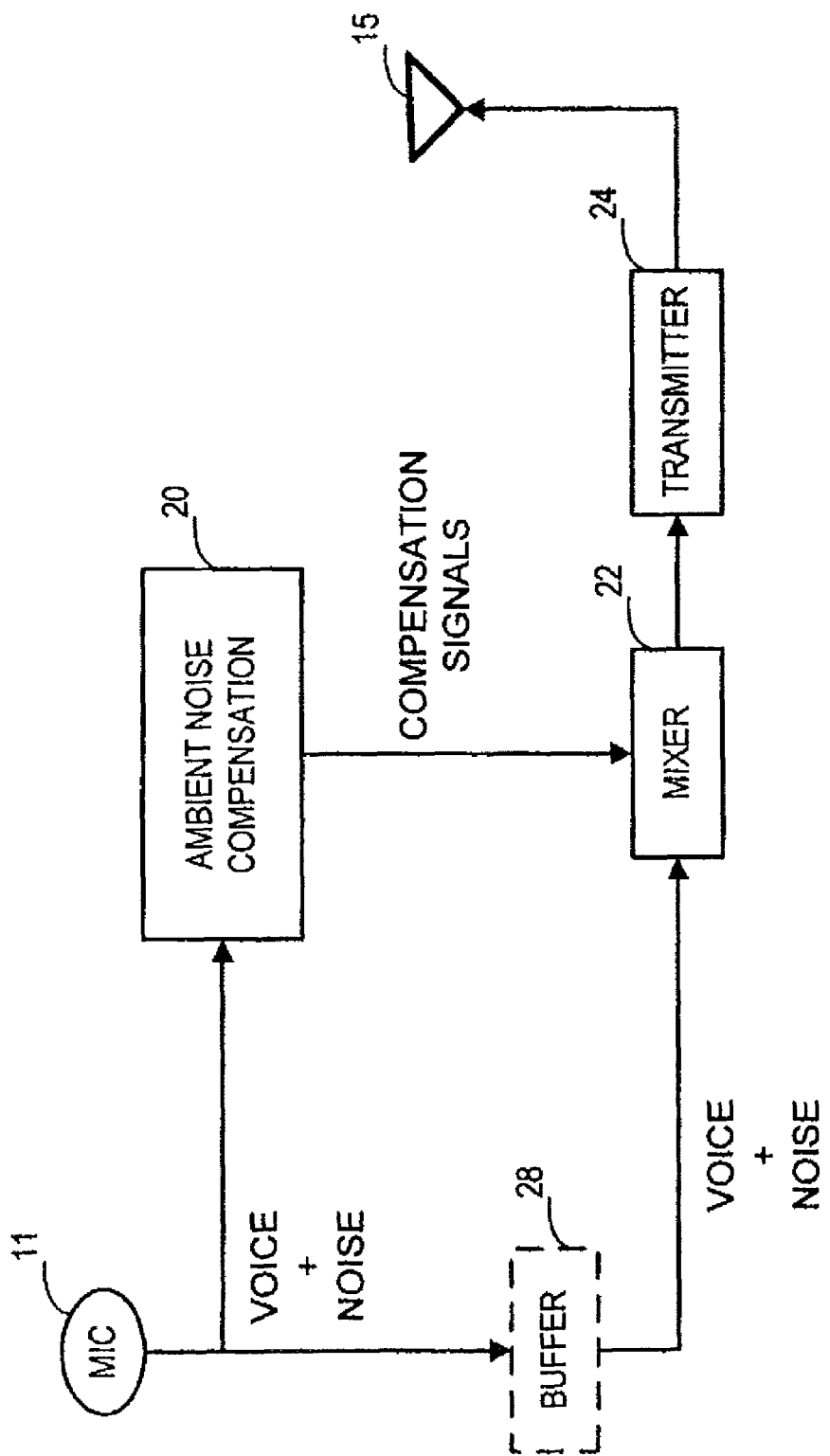
FIG. 2 illustrates an exemplary embodiment of the present invention.

FIG. 2 illustrates an exemplary embodiment of the present invention including microphone 11, ambient noise compensation signal generator 20, a mixer 22, transmitter 24 and antenna 15.

In accordance with the present invention, ambient noise or background noise is cancelled before being combined with the intended voice communication picked up at microphone 11 and sent to transmitter 24 and antenna 15. More specifically, in a first embodiment, microphone 11 picks up both ambient noise as well as the intended voice communication (together, the "combined signal"). As is well known in the art of noise cancellation, it is possible (e.g., via filtering and digital signal processing (DSP) techniques) to attenuate or even cancel-out pre-selected portions of an audio signal or pre-selected bands of a frequency spectrum.

As shown in FIG. 2, ambient noise compensation signal generator 20 is connected to microphone 11 and monitors the combined signal. Then, ambient noise cancellation generator, in accordance with well-known techniques, generates compensation signals that are operable to attenuate or altogether cancel background noise that is not intended or desirable to be transmitted to another party. These compensation signals are fed into mixer 22 where these signals are mixed with the combined signal coining directly from microphone 11. The result is that the ambient noise or background noise is eliminated, or at least substantially reduced, before the combined signal (ambient noise plus voice signal) is passed to transmitter 24 (which, e.g., includes a radio frequency modulator, etc.) and ultimately to antenna 15.

Optionally, a buffer 28 is provided to slow the progress of the combined signal emanating from microphone 11 so that when the combined signal reaches mixer 22 the arrival time of the combined signal and the compensation signals generated by ambient noise cancellation generator is synchronized.

Figure 3:
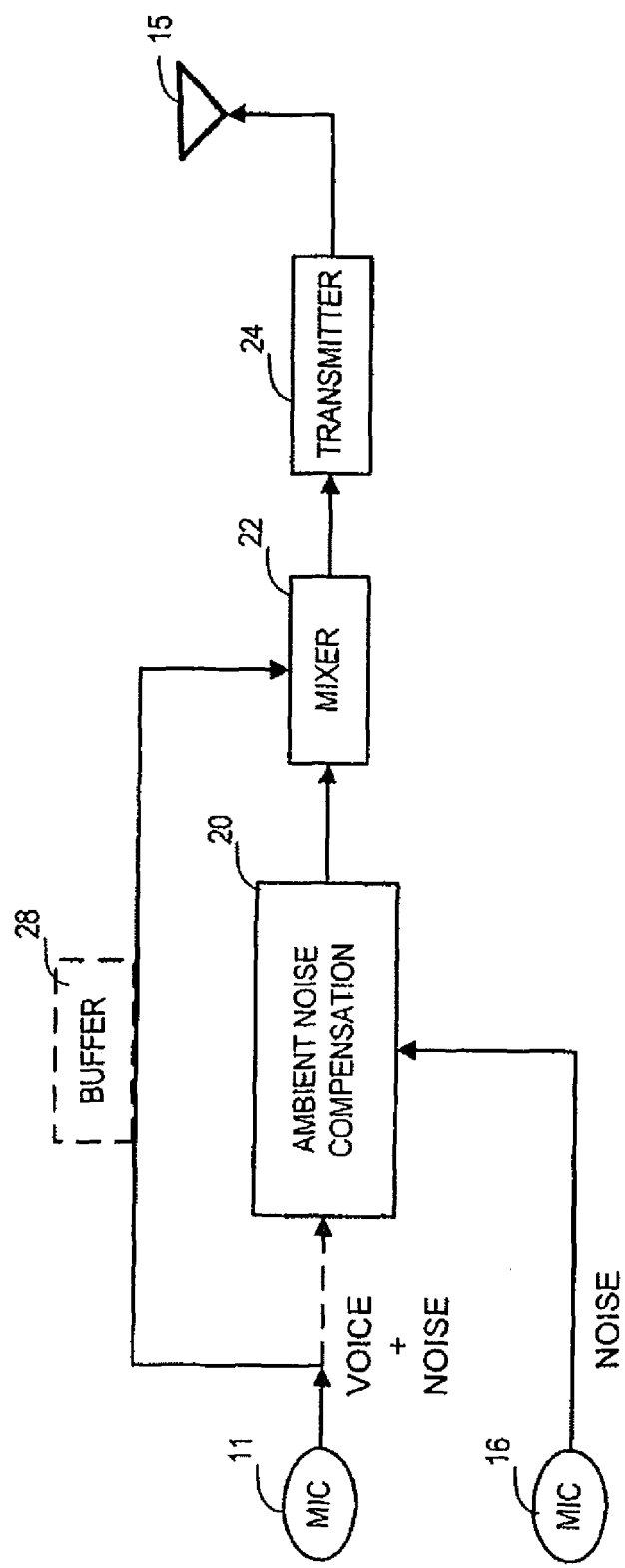
FIG. 3 illustrates a second exemplary embodiment of the present invention.

In another embodiment, as shown in FIG. 3, a second microphone 16 is provided for the principal purpose of sampling ambient noise. That is, microphone 16 is dedicated substantially to picking up ambient noise rather than a voice signal. A second microphone, especially one that is located away from mobile telephone user's mouth would be less affected by the user's own voice when taking the ambient noise level measurement and, thus, might be more desirable in certain implementations of the present invention.

More specifically, it is often the case that microphone 11, which is used primarily for receiving voice signals from a user, is arranged to have directional characteristics, wherein the microphone is more sensitive to sound coming from predetermined directions. In contrast, second microphone 16 is preferably omni-directional such that the microphone is equally sensitive to sound emanating from any direction. A more accurate detection of ambient noise level can be obtained using such an omni-directional microphone. Also, although not shown expressly in the drawings, microphone 16 could be arranged spatially distant from mobile telephone 10. For example, second microphone 16 could be arranged to hang from a wire that is connected to mobile telephone 10, whereby there would be even less chance for the mobile telephone user's voice to interfere with noise cancellation signal generation.

Optionally, in the dual microphone embodiment, microphone 11 is also in communication with ambient noise cancellation signal generator 20 to provide additional signal information to generator 20 to aid in distinguishing more easily between ambient noise and voice signals.

Further in accordance with the present invention there is provided an enable/disable switch 17 (FIG. 1) that is preferably operable to enable/disable ambient noise compensation signal generator 20. For example, depending on the nature of the ambient noise in a particular environment, known noise cancellation techniques might also inadvertently attenuate the voice signal that is intended to be transmitted. In such a case, it is preferable that the noise cancellation features of the present invention be disabled, at least for a limited period, until the ambient noise is such that it can be more effectively distinguished from the voice signal and attenuated independently. For example, a mobile telephone user may want to call a friend from a noisy public event (e.g., a concert or sporting event) for the main purpose of letting the friend hear the background noise. In such a case, the switch 17 is preferably manipulated to disable the noise cancellation features of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    detecting, by a first microphone, a first signal containing voice signals and ambient noise;
    detecting, by a second microphone, a second signal containing the ambient noise;
    receiving a noise cancellation signal indicating whether to cancel the ambient noise;
    providing both the first signal detected by the first microphone and the second signal detected by the second microphone to an ambient noise compensation signal generator;
    responsive to the noise cancellation signal indicating to cancel the ambient noise, enabling the ambient noise compensation signal generator to generate a compensation signal based on the first signal detected by the first microphone and the second signal detected by the second microphone, wherein a mixer mixes the first signal detected by the first microphone with the compensation signal such that the ambient noise contained in the first signal detected by the first microphone is attenuated;
    responsive to the noise cancellation signal indicating not to cancel the ambient noise, disabling the ambient noise compensation signal generator, wherein the mixer mixes the first signal detected by the first microphone with the second signal detected by the second microphone, such that the ambient noise contained in the first signal detected by the first microphone is not attenuated;
    buffering the first signal such that an arrival time of the first signal and the compensation signal at the mixer is synchronized; and
    providing an output of the mixer to a transmitter.

2. The method of claim 1, wherein the mixer receives the first signal directly from the first microphone.

3. The method of claim 1, wherein the first microphone is a directional microphone that is sensitive to sound coming from a predetermined direction, such that the voice signals are predominantly received by the first microphone.

4. The method of claim 1, wherein the second microphone is an omnidirectional microphone that is substantially equally sensitive to sound emanating from any direction, such that the voice signals and the ambient noise are received by the second microphone.

5. The method of claim 1, wherein the ambient noise is substantially eliminated before the output of the mixer is provided to the transmitter.

6. The method of claim 1, wherein the second microphone is spatially distant from the first microphone.

7. The method of claim 6, wherein the first microphone is housed within a mobile telephone.

8. The method of claim 7, wherein the first microphone is positioned towards a mouth of a user, and wherein the second microphone is positioned away from the mouth of the user.

9. The method of claim 8, wherein the second microphone is spaced apart from a housing of the mobile telephone.

10. The method of claim 9, wherein the second microphone is arranged to hang from a wire attached to the mobile telephone.

11. The method of claim 1, further comprising modulating a radio frequency carrier based on the output of the mixer.

12. The method of claim 11, further comprising providing the output of the transmitter to an antenna.

13. A communication device comprising:
a first microphone that provides a first signal containing voice signals and ambient noise;
a second microphone that provides a second signal containing the ambient noise;
a switch that provides a noise cancellation signal indicating whether to cancel the ambient noise;
an ambient noise compensation signal generator in communication with the first microphone, the second microphone and the switch, wherein the ambient noise compensation signal generator receives both the first signal detected by the first microphone and the second signal detected by the second microphone and the noise cancellation signal;
a mixer in communication with the ambient noise compensation signal generator, wherein:
responsive to the noise cancellation signal indicating to cancel the ambient noise, the ambient noise compensation signal generator generates a compensation signal based on the first signal detected by the first microphone and the second signal detected by the second microphone, wherein the mixer mixes the first signal detected by the first microphone with the compensation signal such that the ambient noise contained in the first signal detected by the first microphone is attenuated, and
wherein, responsive to the noise cancellation signal indicating not to cancel the ambient noise, the ambient noise compensation signal generator is disabled, wherein the mixer mixes the first signal detected by the first microphone with the second signal detected by the second microphone, such that the ambient noise contained in the first signal detected by the first microphone is not attenuated;
a buffer in communication between the first microphone and the mixer, wherein the buffer delays the first signal such that an arrival time of the first signal and the compensation signal at the mixer is synchronized; and
a transmitter in communication with an output of the mixer.

14. The communication device of claim 13, wherein the first microphone is a directional microphone that is sensitive to sound coming from a predetermined direction, such that the voice signals are predominantly received by the first microphone.

15. The communication device of claim 13, wherein the second microphone is an omnidirectional microphone that is substantially equally sensitive to sound emanating from any direction, such that the voice signals and the ambient noise are received by the second microphone.

16. The communication device of claim 13, wherein the second microphone is spatially distant from the first microphone.

17. The communication device of claim 13, wherein the first microphone is housed within a mobile telephone.

18. The communication device of claim 17, wherein the first microphone is positioned towards a mouth of a user, and wherein the second microphone is positioned away from the mouth of the user.

19. The communication device of claim 18, wherein the second microphone is spaced apart from a housing of the mobile telephone.

20. The communication device of claim 19, wherein the second microphone is arranged to hang from a wire attached to the mobile telephone.

* * * * *